United States Patent
Honda et al.

(10) Patent No.: US 10,894,859 B2
(45) Date of Patent: Jan. 19, 2021

(54) COPOLYMERIZED POLYESTER RESIN

(71) Applicant: MITSUBISHI GAS CHEMICAL COMPANY, INC., Tokyo (JP)

(72) Inventors: Eiichi Honda, Kanagawa (JP); Yasuaki Yoshimura, Kanagawa (JP); Keita Noguchi, Kanagawa (JP); Yuichiro Satake, Kanagawa (JP); Takashi Motoi, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 26 days.

(21) Appl. No.: 16/336,508

(22) PCT Filed: Sep. 27, 2017

(86) PCT No.: PCT/JP2017/035072
§ 371 (c)(1),
(2) Date: Mar. 26, 2019

(87) PCT Pub. No.: WO2018/062325
PCT Pub. Date: Apr. 5, 2018

(65) Prior Publication Data
US 2020/0247944 A1  Aug. 6, 2020

(30) Foreign Application Priority Data

Sep. 28, 2016  (JP) .................. 2016-190344

(51) Int. Cl.
*C08G 63/60* (2006.01)
*C08G 63/18* (2006.01)

(52) U.S. Cl.
CPC ............. *C08G 63/60* (2013.01); *C08G 63/18* (2013.01)

(58) Field of Classification Search
USPC ....................................................... 528/272
See application file for complete search history.

(56) References Cited

U.S. PATENT DOCUMENTS

| | | |
|---|---|---|
| 2003/0016334 A1 | 1/2003 | Weber et al. |
| 2005/0124779 A1 | 6/2005 | Shelby et al. |
| 2018/0142059 A1 | 5/2018 | Honda et al. |

FOREIGN PATENT DOCUMENTS

| | | |
|---|---|---|
| JP | 58-174419 | 10/1983 |
| JP | 10-306147 | 11/1998 |
| JP | 2001-064372 | 3/2001 |
| JP | 2003-119259 | 4/2003 |
| JP | 2004-530165 | 9/2004 |
| JP | 2007-161917 | 6/2007 |
| JP | 2007-517926 | 7/2007 |
| JP | 2007-314717 | 12/2007 |
| JP | 2010-284943 | 12/2010 |
| JP | 2017/035072 | 1/2018 |
| WO | 2012/035874 | 3/2012 |
| WO | 2015/118966 | 8/2015 |
| WO | 2016/190317 | 12/2016 |

OTHER PUBLICATIONS

Official Communication issued in International Application No. PCT/JP2017/035072, dated Jan. 9, 2018.

*Primary Examiner* — Terressa Boykin
(74) *Attorney, Agent, or Firm* — Greenblum & Bernstein, P.L.C.

(57) ABSTRACT

A copolymerized polyester resin containing a unit (A) represented by the following formula (1), a diol unit (B), and a unit (C) derived from a dicarboxylic acid or an ester-forming derivative of the dicarboxylic acid,
  wherein a content of the unit (A) based on total units of the copolymerized polyester resin is 10 to 95 mol %, and
  the copolymerized polyester resin satisfies the following conditions (1) to (3):
    (1) a glass transition temperature of the copolymerized polyester resin is 90° C. or higher;
    (2) an amount of heat generated by the copolymerized polyester resin at cooling crystallization is 5 J/g or less; and
    (3) an absolute value of photoelastic coefficient of the copolymerized polyester resin is $40 \times 10^{-12}$ $Pa^{-1}$ or less:

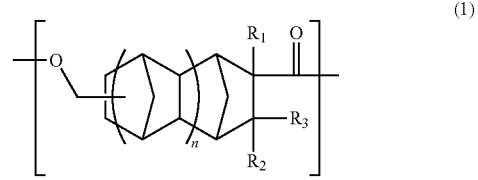

(1)

wherein $R_1$ is a hydrogen atom, $CH_3$, or $C_2H_5$, $R_2$ and $R_3$ are each independently a hydrogen atom or $CH_3$, and n is 0 or 1.

5 Claims, 3 Drawing Sheets

COPOLYMERIZED POLYESTER RESIN

TECHNICAL FIELD

The present invention relates to a copolymerized polyester resin.

BACKGROUND ART

Polyethylene terephthalate (which may be referred to as "PET" hereinafter) is a polyester resin characterized by being superior in transparency, mechanical strength, melt stability, solvent resistance, aroma retention, and recyclability, and is widely used, for example, in films, sheets, and hollow containers. However, the glass transition temperature of PET is not necessarily high enough, and when PET is used to obtain a thick formed body, the crystallinity of PET may result in reduced transparency of the formed body. Therefore, modification through copolymerization has been widely attempted.

For example, polyester resins have been proposed which are produced using 1,4-cyclohexanedimethanol, tricyclodecanedimethanol, or pentacyclopentadecanedimethanol as a copolymerization component. Tricyclodecanedimethanol and pentacyclopentadecanedimethanol have a bulk, rigid skeleton, and thus polyester resins produced using these dimethanols can have a high glass transition temperature and a reduced crystallinity which enables increased transparency of formed bodies (see Patent Literatures 1 and 2, for example).

Among aliphatic polyesters produced without the use of any aromatic component, polyesters having an alicyclic structure are superior in transparency and water resistance, and numerous methods using alicyclic monomers typified by 1,4-cyclohexanedimethanol have been proposed. For example, Patent Literature 3 discloses an aliphatic polyester produced from 1,4-cyclohexanedimethanol and 1,4-cyclohexanedicarboxylic acid or the like. In an effort to increase the heat resistance of aliphatic polyesters, polyesters having a norbornane skeleton have been proposed (see Patent Literatures 4 and 5, for example).

CITATION LIST

Patent Literature

Patent Literature 1: Japanese Patent Laid-Open No. 58-174419
Patent Literature 2: Japanese Patent Laid-Open No. 2003-119259
Patent Literature 3: National Publication of International Patent Application No. 2007-517926
Patent Literature 4: Japanese Patent Laid-Open No. 2001-64372
Patent Literature 5: Japanese Patent Laid-Open No. 2001-64374

SUMMARY OF INVENTION

Technical Problem

The polyester resins described in Patent Literatures 1 and 2 have poor optical characteristics in terms of photoelastic coefficient due to the aromatic property of the dicarboxylic acid component. The aliphatic polyester of Patent Literature 3, although having good transparency, lacks sufficient heat resistance. The polyester resins of Patent Literatures 4 and 5 which have a norbornane skeleton leave room for improvement in terms of the balance between heat resistance and optical characteristics.

Thus, the polyester resins described in Patent Literatures 1 to 5 cannot exhibit sufficient physical properties in terms of heat resistance and optical characteristics, and polyester resins having a good balance between these physical properties have not been obtained.

The present invention has been made in view of the above problems of the prior art, and it is an object of the present invention to provide a polyester resin superior in heat resistance and optical characteristics.

Solution to Problem

As a result of intensive investigations aimed at solving the above problems, the present inventors have found that a copolymerized polyester resin having a specific amount of structural unit having a specific alicyclic structure can be a solution to the problems.

That is, the present invention is as follows.

[1]
A copolymerized polyester resin comprising a unit (A) represented by the following formula (1), a diol unit (B), and a unit (C) derived from a dicarboxylic acid or an ester-forming derivative of the dicarboxylic acid,
wherein a content of the unit (A) based on total units of the copolymerized polyester resin is 10 to 95 mol %, and
the copolymerized polyester resin satisfies the following conditions (1) to (3):
  (1) a glass transition temperature of the copolymerized polyester resin is 90° C. or higher;
  (2) an amount of heat generated by the copolymerized polyester resin at cooling crystallization is 5 J/g or less; and
  (3) an absolute value of photoelastic coefficient of the copolymerized polyester resin is $40 \times 10^{-12}$ $Pa^{-1}$ or less:

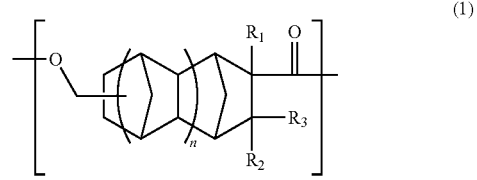

wherein $R_1$ is a hydrogen atom, $CH_3$, or $C_2H_5$, $R_2$ and $R_3$ are each independently a hydrogen atom or $CH_3$, and n is 0 or 1.

[2]
The copolymerized polyester resin according to [1], wherein, in the formula (1), n is 1.

[3]
The copolymerized polyester resin according to [1] or [2], wherein, in the formula (1), $R_1$, $R_2$, and $R_3$ are hydrogen atoms.

[4]
The copolymerized polyester resin according to any one of [1] to [3], wherein the unit (B) is a unit derived from an aliphatic diol or a diol having a cardo structure.

[5]
The copolymerized polyester resin according to any one of [1] to [4], wherein the unit (C) is a unit derived from an aliphatic dicarboxylic acid or an ester-forming derivative of the aliphatic dicarboxylic acid or a unit derived from a dicarboxylic acid having a cardo structure or an ester-forming derivative of the dicarboxylic acid having the cardo structure.

Advantageous Effects of Invention

The copolymerized polyester resin of the present invention is superior in heat resistance and optical characteristics.

DESCRIPTION OF EMBODIMENTS

Figure 1:
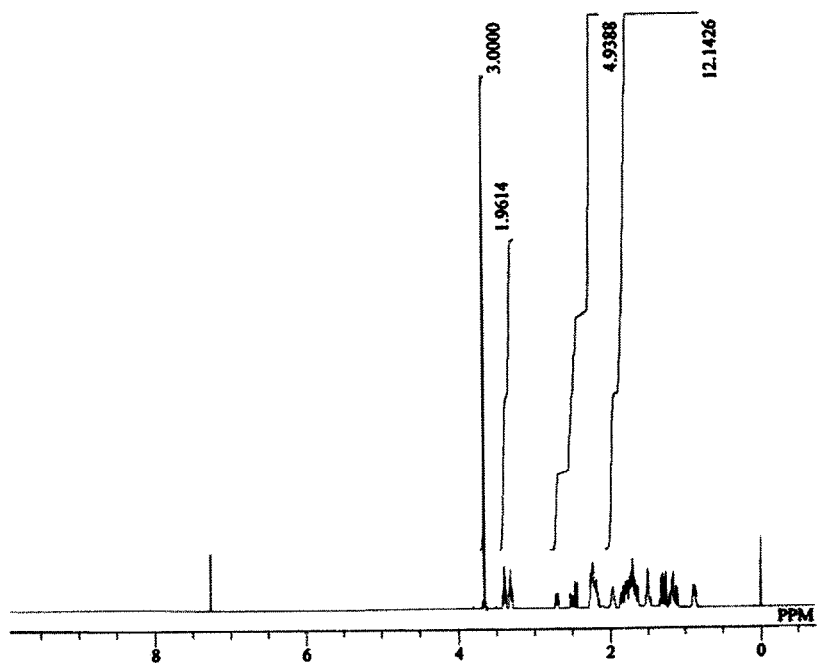
FIG. 1 shows a result of 1H-NMR measurement of a main reaction product obtained in a monomer synthesis example.

An embodiment for carrying out the present invention (which will be simply referred to as "present embodiment" hereinafter) will now be described in detail. The present embodiment described below is only illustrative of the present invention and is not intended to limit the present invention to the contents of the following description. The present invention can be carried out with appropriate modifications falling within the gist of the invention.
[Copolymerized Polyester Resin]
A copolymerized polyester resin of the present embodiment is a copolymerized polyester resin comprising a unit (A) represented by the following formula (1) (this unit may be referred to as "unit (A)" hereinafter), a diol unit (B) (this unit may be referred to as "unit (B)" hereinafter), and a unit (C) derived from a dicarboxylic acid or an ester-forming derivative thereof (this unit may be referred to as "unit (C)" hereinafter). The content of the unit (A) based on the total units of the copolymerized polyester resin is 10 to 95 mol %. The copolymerized polyester resin satisfies the following conditions (1) to (3):
(1) the glass transition temperature of the copolymerized polyester resin is 90° C. or higher;
(2) the amount of heat generated by the copolymerized polyester resin at cooling crystallization is 5 J/g or less; and
(3) the absolute value of photoelastic coefficient of the copolymerized polyester resin is $40 \times 10^{-12}$ $Pa^{-1}$ or less.

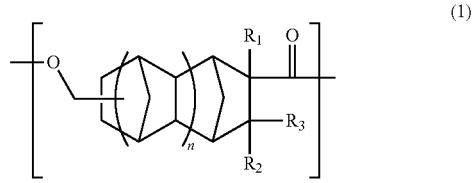

(1)

In the formula (1), $R_1$ is a hydrogen atom, $CH_3$, or $C_2H_5$, $R_2$ and $R_3$ are each independently a hydrogen atom or $CH_3$, and n is 0 or 1.

Being configured as described above, the copolymerized polyester resin of the present embodiment is superior in heat resistance and optical characteristics. In the present embodiment, "superior in heat resistance" indicates that the glass transition temperature (Tg) as measured by the method described in Examples below is sufficiently high, and "superior in optical characteristics" indicates that the absolute value of the photoelastic coefficient as measured by the method described in Examples below is sufficiently low.

In the formula (1), $R_1$ is preferably a hydrogen atom or $CH_3$, and $R_2$ and $R_3$ are preferably hydrogen atoms. In the present embodiment, $R_1$, $R_2$, and $R_3$ in the formula (1) are more preferably hydrogen atoms from the viewpoint of heat resistance.

In the formula (1), n is preferably 1 in order to further improve the heat resistance.

In the present embodiment, the content of the unit (A) based on the total units of the copolymerized polyester resin is 10 to 95 mol % from the viewpoint of the balance between heat resistance and optical characteristics. If the content is less than 10 mol %, sufficient heat resistance or optical characteristics cannot be achieved. When the content is 95 mol % or less, the formability of the resin can be improved while good heat resistance and optical characteristics are obtained. From the same viewpoint, the content of the unit (A) is preferably 15 to 95 mol % and more preferably 20 to 95 mol %.

The unit (B) in the present embodiment is not particularly limited and may be any unit derived from a diol. Specific examples of the unit (B) include units derived from the following diols: ethylene glycol, trimethylene glycol, 1,4-butanediol, 1,5-pentanediol, 1,6-hexanediol, diethylene glycol, propylene glycol, neopentyl glycol, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, pentacyclopentadecanedimethanol, decahydro-1,4:5,8-dimethanonaphthalenedimethanol, norbornanediol, cyclohexanediol, 2,2'-bis(4-hydroxycyclohexyl)propane, adamantanediol, decahydro-1,4:5,8-dimethanonaphthalenediol, 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-phenylphenyl]fluorene, 9,9-bis(2-hydroxyethyl) fluorene, xylylene glycol, 3,9-bis(1,1-dimethyl-2-hydroxyethyl)-2,4,8,10-tetraoxaspiro[5.5]undecane, 1,4:3,6-dianhydro-D-sorbitol, and 2,2,4,4-tetramethyl-1,3-cyclobutanediol.

In the present embodiment, the unit (B) is preferably a unit derived from an aliphatic diol or a diol having a cardo structure. From the viewpoint of the property balance between heat resistance and optical characteristics, the unit derived from an aliphatic diol is more preferably a unit derived from 1,4-cyclohexanedimethanol, ethylene glycol, 3,9-bis(1,1-dimethyl-2-hydroxyethyl)-2,4,8,10-tetraoxaspiro[5.5]undecane, 1,4:3,6-dianhydro-D-sorbitol, or decahydro-1,4:5,8-dimethanonaphthalenedimethanol. The unit derived from a diol having a cardo structure is more preferably a unit derived from 9,9-bis[4-(2-hydroxyethoxy)phenyl]fluorene, 9,9-bis[4-(2-hydroxyethoxy)-3-methylphenyl] fluorene, or 9,9-bis[4-(2-hydroxyethoxy)-3-phenylphenyl] fluorene. The optical isomerism of these diols is not particularly limited, and they may be a cis isomer, a trans isomer, or a mixture thereof.

One of the above units may be contained alone, or two or more of the above units may be contained in combination.

The content of the unit (B) in the copolymerized polyester resin of the present embodiment is preferably 2 to 60 mol % and more preferably 3 to 50 mol %.

The unit (C) in the present embodiment is not particularly limited and may be any unit derived from a dicarboxylic acid or an ester-forming derivative of the dicarboxylic acid. Specific examples of the unit (C) include: structural units derived from aromatic dicarboxylic acids such as terephthalic acid, isophthalic acid, phthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 2-methylterephthalic acid, biphenyldicarboxylic acid, and tetralindicarboxylic acid and/or derivatives of these aromatic dicarboxylic acids; units derived from aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane, 1,4:5,8-dimethanodecahydronaphthalenedicarboxylic acid, adamantanedicarboxylic acid, and dimer acid and/or derivatives of these aliphatic dicarboxylic acids; and units derived from dicarboxylic acids.

In the present embodiment, the unit (C) is preferably a unit derived from an aliphatic dicarboxylic acid or an ester-forming derivative thereof or a unit derived from a dicarboxylic acid having a cardo structure or an ester-forming derivative thereof. The unit derived from an aliphatic dicarboxylic acid or an ester-forming derivative thereof is more preferably a unit derived from dimethyl 1,4-cyclohexanedicarboxylate from the viewpoint of the property balance of heat resistance and optical characteristics. The unit derived from a dicarboxylic acid having a cardo structure or an ester-forming derivative thereof is more preferably a unit derived from 9,9-bis(methoxycarbonylmethyl)fluorene, 9,9-bis(methoxycarbonylethyl)fluorene, or 9,9-bis(methoxycarbonylpropyl)fluorene from the viewpoint of the property balance of transparency, heat resistance, and optical characteristics. The optical isomerism of these dicarboxylic acids and derivatives thereof is not particularly limited, and they may be a cis isomer, a trans isomer, or a mixture thereof.

One of the above units may be contained alone, or two or more of the above units may be contained in combination.

The content of the unit (C) in the copolymerized polyester resin of the present embodiment is preferably 2 to 60 mol % and more preferably 3 to 50 mol %.

In the present embodiment, the copolymerized polyester resin may contain a hydroxyl group and a unit other than the units (A) to (C), and the other unit is, for example, a unit (A1) derived from a carboxylic acid or an ester-forming derivative thereof. The unit (A1) is not particularly limited, and examples thereof include units derived from oxyacids such as glycolic acid, lactic acid, hydroxybutyric acid, 2-hydroxyisobutyric acid, hydroxybenzoic acid, 6-hydroxycaproic acid, and 4-hydroxycyclohexanecarboxylic acid and/or derivatives of these oxyacids.

In the present embodiment, in order to obtain sufficient heat resistance, the glass transition temperature (Tg) of the copolymerized polyester resin is 90° C. or higher, preferably 95° C. or higher, and more preferably 100° C. or higher. The Tg can be measured by the method described in Examples below. The Tg can be adjusted within the above range, for example, by appropriately adjusting the proportions of starting monomers for the copolymerized polyester resin in copolymerization.

In the present embodiment, in order to obtain sufficient transparency, the amount of heat generated by the copolymerized polyester resin at cooling crystallization is 5 J/g or less, preferably 1 J/g or less, and more preferably 0.3 J/g or less. The amount of heat generated at cooling crystallization can be measured by the method described in Examples below. The amount of heat generated at cooling crystallization can be adjusted within the above range, for example, by appropriately adjusting the proportions of starting monomers for the copolymerized polyester resin in copolymerization.

In the present embodiment, the formability of the copolymerized polyester resin can be demonstrated by the fact that the melt viscosity as measured by the method described in Examples below is sufficiently low. That is, in order to obtain sufficient formability, the melt viscosity of the copolymerized polyester resin, as measured at a shear velocity of 60 sec$^{-1}$ and a temperature of 280° C., is preferably 1000 Pa·s or less, more preferably 950 Pa·s or less, and even more preferably 900 Pa·s or less. The melt viscosity can be measured by the method described in Examples below. The melt viscosity can be adjusted within the above range, for example, by appropriately adjusting the proportions of starting monomers for the copolymerized polyester resin in copolymerization.

In the present embodiment, the absolute value of the photoelastic coefficient of the copolymerized polyester resin is $40 \times 10^{-12}$ Pa$^{-1}$ or less, preferably $30 \times 10^{-12}$ Pa$^{-1}$ or less, more preferably $28 \times 10^{-12}$ Pa$^{-1}$ or less, and even more preferably $25 \times 10^{-12}$ Pa$^{-1}$ or less. The absolute value of the photoelastic coefficient can be measured by the method described in Examples below. The absolute value of the photoelastic coefficient can be adjusted within the above range, for example, by appropriately adjusting the proportions of starting monomers for the polyester resin in copolymerization.

Further, when the copolymerized polyester resin of the present embodiment is used, it is suitable to add an antioxidant, a release agent, an ultraviolet absorber, a flowability improver, a crystal nucleating agent, a toughener, a dye, an anti-static agent, or an anti-microbial agent.

[Method of Producing Copolymerized Polyester Resin]

The copolymerized polyester resin of the present embodiment can be obtained by copolymerization of monomers corresponding to the units (A) to (C). The following will describe a method of producing a monomer corresponding to the unit (A). Such a monomer is represented, for example, by the following formula (2).

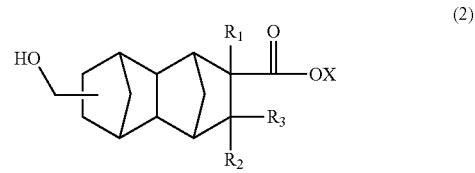

(2)

In the formula (2), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In the formula (2), $R_1$ is preferably a hydrogen atom or $CH_3$. $R_2$ and $R_3$ are preferably hydrogen atoms. Examples of the hydrocarbon group include, but are not limited to, methyl, ethyl, propyl, butyl, vinyl, 2-hydroxyethyl, and 4-hydroxybutyl groups.

The compound represented by the formula (2) in the present embodiment can be synthesized, for example, by a route of the following formula (I) using dicyclopentadiene or cyclopentadiene and a functional group-containing olefin as starting materials.

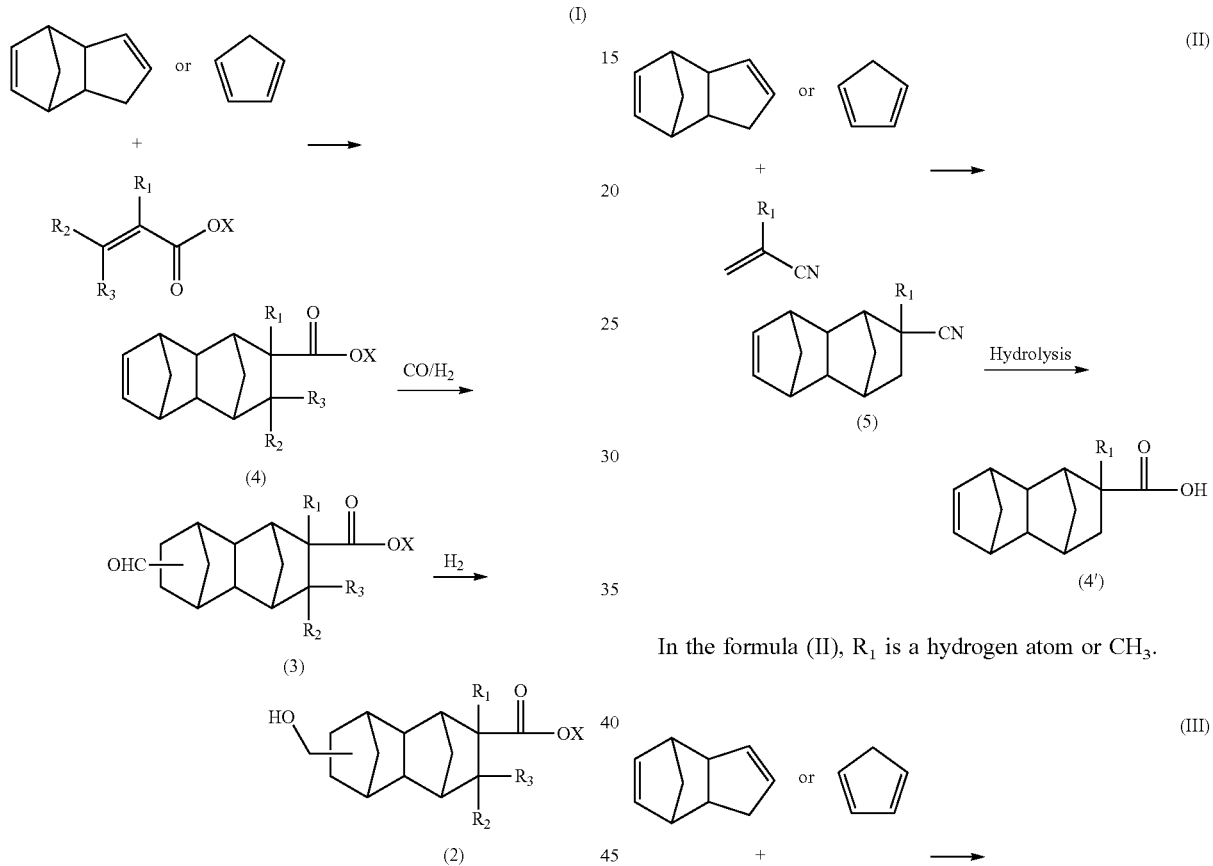

In the formula (I), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

[Production of $C_{13}$ to $C_{21}$ Monoolefin Represented by Formula (4) in Formula (I)]

The $C_{13}$ to $C_{21}$ monoolefin represented by the formula (4) can be produced, for example, by a Diels-Alder reaction between a functional group-containing olefin and dicyclopentadiene.

Specific examples of the functional group-containing olefin used for the Diels-Alder reaction include, but are not limited to, methacrylic acid, methyl methacrylate, ethyl methacrylate, propyl methacrylate, butyl methacrylate, vinyl methacrylate, 2-hydroxyethyl methacrylate, 4-hydroxybutyl methacrylate, acrylic acid, methyl acrylate, ethyl acrylate, propyl acrylate, butyl acrylate, vinyl acrylate, 2-hydroxyethyl acrylate, 4-hydroxybutyl acrylate, crotonic acid, methyl crotonate, ethyl crotonate, 3-methylcrotonic acid, methyl 3-methylcrotonate, and ethyl 3-ethylcrotonate. Preferred olefins include methacrylic acid, methyl methacrylate, 2-hydroxyethyl methacrylate, acrylic acid, methyl acrylate, and 2-hydroxyethyl acrylate. More preferred olefins include methyl methacrylate and methyl acrylate.

Examples of the functional group-containing olefin used for the Diels-Alder reaction further include acrylonitrile, methacrylonitrile, acrolein, and methacrolein. With the use of such an olefin as a starting material, for example, a monoolefin represented by formula (4') can be produced by the route represented by the following formula (II) or (III).

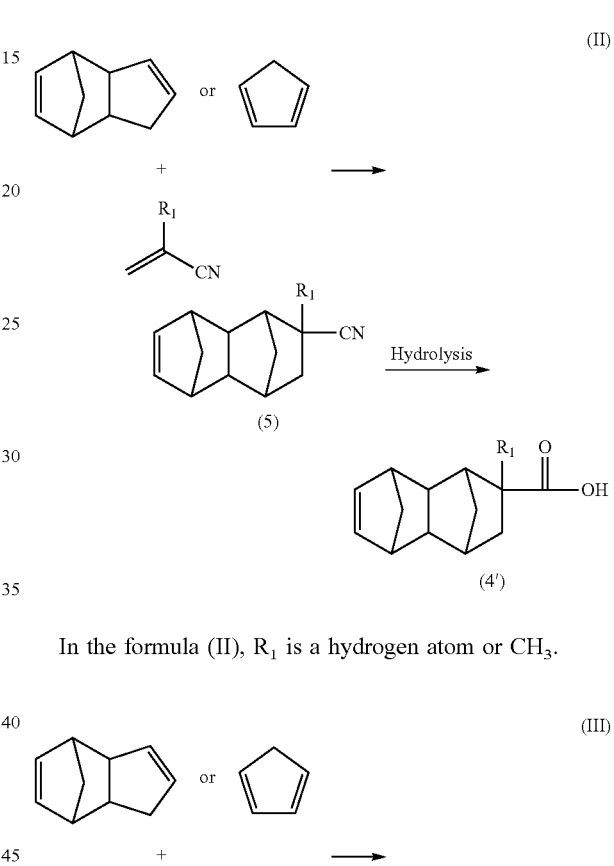

In the formula (II), $R_1$ is a hydrogen atom or $CH_3$.

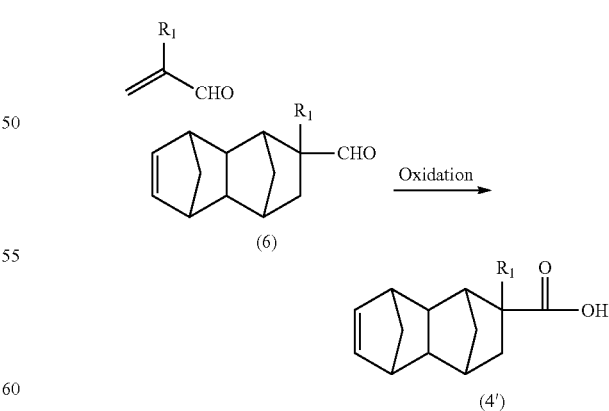

In the formula (III), $R_1$ is a hydrogen atom or $CH_3$.

The dicyclopentadiene used for the Diels-Alder reaction is preferably highly pure, and the contents of butadiene, isoprene, and other substances are preferably reduced. The purity of the dicyclopentadiene is preferably 90% or more and more preferably 95% or more. Dicyclopentadiene is prone to be depolymerized into cyclopentadiene (so-called monocyclopentadiene) under heating conditions, and it is thus possible to use cyclopentadiene instead of dicyclopentadiene. The $C_{13}$ to $C_{21}$ monoolefin represented by the formula (4) is thought to be produced substantially via a $C_8$ to $C_{16}$ monoolefin represented by the following formula (7) (product of first Diels-Alder reaction), and the produced monoolefin represented by the formula (7) is thought to act as a new diene-reactive compound (dienophile) which is involved in a Diels-Alder reaction (second Diels-Alder reaction) with cyclopentadiene (diene) present in the reaction system to produce the $C_{13}$ to $C_{21}$ monoolefin represented by the formula (4).

In view of these points, for example, the $C_{13}$ to $C_{21}$ monoolefin represented by the formula (4) or the $C_8$ to $C_{16}$ monoolefin represented by the formula (7) can be selectively obtained by appropriately controlling the reaction conditions of the first Diels-Alder reaction in the reaction route represented by the formula (I).

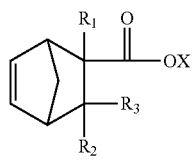

(7)

In the formula (7), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In order to allow the two-step Diels-Alder reaction to proceed efficiently, i.e., in order to selectively obtain the $C_{13}$ to $C_{21}$ monoolefin represented by the formula (4), the presence of cyclopentadiene in the reaction system is important. Therefore, the reaction temperature is preferably 100° C. or higher, more preferably 120° C. or higher, and even more preferably 130° C. or higher. In order to selectively obtain the $C_8$ to $C_{16}$ monoolefin represented by the formula (7), the reaction temperature is preferably lower than 180° C. In either case, the reaction is preferably carried out at a temperature of 250° C. or lower in order to inhibit formation of a high-boiling substance as a by-product.

The $C_{13}$ to $C_{21}$ monoolefin represented by the formula (4) obtained as described above can be subjected to a hydroformylation reaction and reduction reaction as described below to obtain a monomer corresponding to the unit represented by the formula (1) wherein n=1 (i.e., a compound represented by the formula (2)). The $C_8$ to $C_{16}$ monoolefin represented by the formula (7) obtained as described above can be subjected to a similar hydroformylation reaction and reduction reaction to obtain a monomer corresponding to the unit represented by the formula (1) wherein n=0 (i.e., a compound represented by the formula (8)).

A hydrocarbon, an alcohol, or an ester can also be used as the reaction solvent and, for example, aliphatic hydrocarbons having 6 or more carbon atoms, cyclohexane, toluene, xylene, ethylbenzene, mesitylene, propanol, and butanol are preferred. A known catalyst such as $AlCl_3$ may be added if necessary.

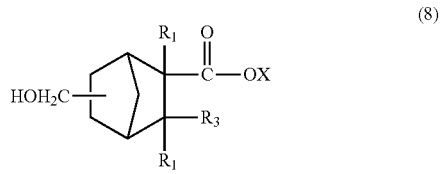

(8)

In the formula (8), $R_1$ is a hydrogen atom, $CH_3$, or $C_2H_5$, $R_2$ and $R_3$ are each independently a hydrogen atom or $CH_3$, and X is a hydrogen atom or a hydrocarbon group having four or less carbon atoms and optionally containing a hydroxyl group.

The Diels-Alder reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate is made to flow in a tubular reactor under predetermined reaction conditions.

The reaction product as obtained by the Diels-Alder reaction may directly be used as a starting material for the hydroformylation reaction or may be purified by a technique such as distillation, extraction, or crystallization prior to being subjected to the subsequent step.

[Production of $C_{14}$ to $C_{22}$ Difunctional Compound Represented by (3) in Formula (I)]

The $C_{14}$ to $C_{22}$ difunctional compound represented by the formula (3) in the formula (I) can be produced, for example, by subjecting the $C_{13}$ to $C_{21}$ monoolefin represented by the formula (4), carbon monoxide gas, and hydrogen gas to a hydroformylation reaction in the presence of a rhodium compound and an organophosphorus compound.

The rhodium compound used in the hydroformylation reaction may be any compound which forms a complex with an organophosphorus compound and which exhibits hydroformylation activity in the presence of carbon monoxide and hydrogen, and the form of the precursor of the rhodium compound is not particularly limited. For example, a catalyst precursor such as dicarbonylacetylacetonato rhodium (hereinafter referred to as "Rh(acac)(CO)$_2$"), $Rh_2O_3$, $Rh_4(CO)_{12}$, $Rh_6(CO)_{16}$, or $Rh(NO_3)_3$ may be introduced, together with an organophosphorus compound, into a reaction mixture, and thus a rhodium carbonyl hydride-phosphorus complex having catalytic activity may be formed in a reaction vessel. Alternatively, a rhodium carbonyl hydride-phosphorus complex may be prepared beforehand, and the prepared complex may be introduced into a reactor. A specific example of preferred methods is a method in which Rh(acac)(CO)$_2$ is reacted with an organophosphorus compound in the presence of a solvent and then the reaction product is introduced together with excess of the organophosphorus compound into a reactor so as to give a rhodium-organophosphorus complex having catalytic activity.

Investigations by the present inventors have revealed that a two-step Diels-Alder reaction product represented by the formula (4) which has an internal olefin with a relatively high molecular weight can be hydroformylated with an extremely small amount of rhodium catalyst. The amount of the rhodium compound used in the hydroformylation reaction is preferably 0.1 to 60 micromoles, more preferably 0.1 to 30 micromoles, even more preferably 0.2 to 20 micromoles, and particularly preferably 0.5 to 10 micromoles, based on 1 mole of the $C_{13}$ to $C_{21}$ monoolefin represented by the formula (4) which is a substrate in the hydroformylation reaction. When the amount of the rhodium compound used is less than 60 micromoles based on 1 mole of the $C_{13}$ to $C_{21}$ monoolefin, it can be considered that there is no practical need for any installation for collecting and recycling the rhodium complex. Thus, the present embodiment enables reduction in economic burden associated with collecting/recycling installations, thereby allowing reduction in cost associated with rhodium catalysts.

The organophosphorus compound which forms the hydroformylation reaction catalyst for the hydroformylation reaction in the present embodiment together with the rhodium compound is not particularly limited, and examples of the organophosphorus compound include a phosphine represented by the formula $P(-R_a)(-R_b)(-R_c)$ and a phosphite represented by the formula $P(-OR_a)(-OR_b)(-OR_c)$. Specific examples of $R_a$, $R_b$, and $R_c$ include, but are not limited to, an aryl group which may be substituted with a $C_1$ to $C_4$ alkyl or alkoxy group and an alicyclic alkyl group which may be substituted with a $C_1$ to $C_4$ alkyl or alkoxy group. Triphenylphosphine and triphenyl phosphite are suitably used. The amount of the organophosphorus compound used is preferably 300 to 10000 times, more preferably 500 to 10000 times, even more preferably 700 to 5000 times, particularly preferably 900 to 2000 times, the amount of rhodium atoms in the rhodium compound on a molar basis. When the amount of the organophosphorus compound used is 300 or more times the amount of rhodium atoms on a molar basis, sufficient stability of the rhodium carbonyl hydride-phosphorus complex serving as a catalytically active material tends to be obtained, with the result that good reactivity tends to be obtained. The reason why the amount of the organophosphorus compound used is preferably 10000 or less times the amount of rhodium atoms on a molar basis is that in this case the cost spent on the organophosphorus compound can be sufficiently reduced.

The hydroformylation reaction can be carried out without the use of any solvent. However, with the use of a solvent inert in the reaction, the reaction can be accomplished in a more preferred manner. The solvent used in the hydroformylation reaction is not particularly limited and can be any solvent capable of dissolving the $C_{13}$ to $C_{21}$ monoolefin represented by the formula (4), dicyclopentadiene or cyclopentadiene, the rhodium compound, and the organophosphorus compound. Specific examples of the solvent include, but are not limited to: hydrocarbons such as aliphatic hydrocarbons, alicyclic hydrocarbons, and aromatic hydrocarbons; esters such as aliphatic esters, alicyclic esters, and aromatic esters; alcohols such as aliphatic alcohols and alicyclic alcohols; and solvents such as aromatic halides. Among these, hydrocarbons are suitably used and, in particular, alicyclic hydrocarbons and aromatic hydrocarbons are more suitably used.

The temperature during the hydroformylation reaction is preferably 40° C. to 160° C. and more preferably 80° C. to 140° C. When the reaction temperature is 40° C. or higher, a sufficient reaction rate tends to be achieved, and the monoolefin as a starting material tends to be prevented from remaining unreacted. Setting the reaction temperature to 160° C. or lower tends to reduce formation of by-products derived from the starting monoolefin or the reaction product and effectively prevent decrease in reaction performance.

The hydroformylation reaction in the present embodiment is preferably carried out under pressurization with carbon monoxide (occasionally referred to as "CO" hereinafter) gas and hydrogen (occasionally referred to as "$H_2$" hereinafter) gas. In this case, the CO and $H_2$ gases can be each independently introduced into the reaction system or can be introduced into the reaction system together in the form of a mixed gas prepared beforehand. The molar ratio between the CO and $H_2$ gases (=CO/$H_2$) introduced into the reaction system is preferably 0.2 to 5, more preferably 0.5 to 2, and even more preferably 0.8 to 1.2. When the molar ratio between the CO and $H_2$ gasses is adjusted within the above range, the activity of the hydroformylation reaction or the selectivity to the intended aldehyde tends to be increased. The amount of the CO and $H_2$ gases introduced into the reaction system decreases as the reaction proceeds, and thus the use of a CO/$H_2$ mixed gas prepared beforehand may facilitate the reaction control.

The reaction pressure in the hydroformylation reaction is preferably 1 to 12 MPa, more preferably 1.2 to 9 MPa, and even more preferably 1.5 to 5 MPa. Setting the reaction pressure to 1 MPa or more tends to provide a sufficient reaction rate, and tends to sufficiently prevent the monoolefin as a starting material from remaining unreacted. Setting the reaction pressure to 12 MPa or less eliminates the need for any expensive installation having high pressure resistance and is therefore economically advantageous. In particular, when the reaction is carried out in a batch mode or semibatch mode which involves depressurization by discharge of the CO and $H_2$ gases after completion of the reaction, a lower reaction pressure causes a smaller loss of the CO and $H_2$ gases and is therefore more economically advantageous.

The suitable reaction mode of the hydroformylation reaction is a batch reaction or semibatch reaction. The semibatch reaction can be carried out by placing the rhodium compound, the organophosphorus compound, and the solvent in a reactor, creating the previously described reaction conditions through pressurization with a CO/$H_2$ gas and/or heating, and then supplying the monoolefin as a starting material or a solution of the monoolefin to the reactor.

The reaction product as obtained by the hydroformylation reaction may directly be used as a starting material for the subsequent reduction reaction or may be purified by distillation, extraction, or crystallization prior to being subjected to the subsequent step.

[Production of $C_{14}$ to $C_{22}$ Compound Represented by Formula (2)]

The $C_{14}$ to $C_{22}$ compound represented by the formula (2) in the formula (I) can be produced by a reduction reaction of the $C_{14}$ to $C_{22}$ compound represented by the formula (3) in the presence of a catalyst having hydrogenation activity and hydrogen.

In the reduction reaction, a catalyst containing at least one element selected from the group consisting of copper, chromium, iron, zinc, aluminum, nickel, cobalt, and palladium is preferably used as the catalyst having hydrogenation activity. Examples of more preferred catalysts include a Cu—Cr catalyst, a Cu—Zn catalyst, and a Cu—Zn—Al catalyst and further include a Raney-Ni catalyst and a Raney-Co catalyst. A Cu—Cr catalyst and a Raney-Co catalyst are even more preferred.

The amount of the hydrogenation catalyst used is 1 to 100% by mass, preferably 2 to 50% by mass, and more preferably 5 to 30% by mass, based on the $C_{14}$ to $C_{22}$ compound represented by the formula (3) which is a substrate. Setting the amount of the catalyst used within these ranges enables the hydrogenation reaction to take place in a suitable manner. When the amount of the catalyst used is 1% by mass or more, the reaction tends to be achieved sufficiently to obtain a sufficient yield of the intended product. When the amount of the catalyst used is 100% by mass or less, a good balance tends to be established between the amount of the catalyst used for the reaction and the increasing effect on the reaction rate.

The reaction temperature in the reduction reaction is preferably 60 to 200° C. and more preferably 80° C. to 150° C. Setting the reaction temperature to 200° C. or lower tends to prevent the occurrence of side reaction or decomposition reaction and give the intended product in a high yield. Setting the reaction temperature to 60° C. or higher tends to allow completion of the reaction in a moderate period of time and enable avoidance of decrease in productivity or decrease in yield of the intended product.

The reaction pressure in the reduction reaction, as expressed by a hydrogen partial pressure, is preferably 0.5 to 10 MPa and more preferably 1 to 5 MPa. Setting the hydrogen partial pressure to 10 MPa or less tends to prevent the occurrence of side reaction or decomposition reaction and give the intended product in a high yield. Setting the hydrogen partial pressure to 0.5 MPa or more tends to allow completion of the reaction in a moderate period of time and enable avoidance of decrease in productivity or decrease in yield of the intended product. In the reduction reaction, an inert gas (such as nitrogen or argon) may be additionally present.

In the reduction reaction, a solvent can be used. Examples of the solvent used in the reduction reaction include aliphatic hydrocarbons, alicyclic hydrocarbons, aromatic hydrocarbons, and alcohols, among which alicyclic hydrocarbons, aromatic hydrocarbons, and alcohols are preferred. Specific examples of the solvent include cyclohexane, toluene, xylene, methanol, ethanol, and 1-propanol.

The reduction reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate or substrate solution is made to flow in a tubular reactor filled with a forming catalyst under predetermined reaction conditions.

The reaction product obtained by the reduction reaction can be purified, for example, by distillation, extraction, or crystallization.

The method used in the present embodiment to copolymerize the compound represented by the formula (2) or the compound represented by the formula (8) as a monomer corresponding to the unit (A) with other monomers corresponding to the units (B) and (C) is not particularly limited, and a conventionally known method for producing polyester can be employed. Examples of the method include: melt polymerization methods such as transesterification and direct esterification; and solution polymerization methods.

For production of the copolymerized polyester resin of the present embodiment, a catalyst used for production of common polyester resins, such as a transesterification catalyst, an esterification catalyst, or a polycondensation catalyst, may be used. The catalyst is not particularly limited, and examples thereof include: compounds (e.g., fatty acid salts, carbonic acid salts, phosphoric acid salts, hydroxides, chlorides, oxides, and alkoxides) of metals such as zinc, lead, cerium, cadmium, manganese, cobalt, lithium, sodium, potassium, calcium, nickel, magnesium, vanadium, aluminum, titanium, antimony, germanium, and tin; and metallic magnesium. These may be used alone, or two or more thereof may be used in combination. Among the above examples, preferred catalysts are compounds of manganese, cobalt, zinc, titanium, calcium, antimony, germanium, and tin. Compounds of manganese, titanium, antimony, germanium, and tin are more preferred. The amount of such a catalyst used is not particularly limited. The catalyst amount on a metal component basis is preferably 1 to 1000 ppm, more preferably 3 to 750 ppm, and even more preferably 5 to 500 ppm, based on the starting materials for the polyester resin.

The reaction temperature in the polymerization reaction depends on the type and amount of the catalyst used and is typically selected in the range of 150° C. to 300° C. From the viewpoint of the reaction rate and coloring of the resulting resin, the reaction temperature is preferably 180° C. to 280° C. It is preferable that the pressure inside the reaction tank be initially atmospheric pressure and finally controlled to 1 kPa or less, more preferably to 0.5 kPa or less.

For the polymerization reaction, a phosphorus compound may be added if desired. Examples of the phosphorus compound include, but are not limited to, phosphoric acid, phosphorous acid, phosphoric acid esters, and phosphorous acid esters. Examples of the phosphoric acid esters include, but are not limited to, methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate, and triphenyl phosphate. Examples of the phosphorous acid esters include, but are not limited to, methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite, and triphenyl phosphite. These may be used alone, or two or more thereof may be used in combination. The concentration of phosphorus atoms in the copolymerized polyester resin of the present embodiment is preferably 1 to 500 ppm, more preferably 5 to 400 ppm, and even more preferably 10 to 200 ppm.

For production of the copolymerized polyester resin of the present embodiment, an etherification inhibitor, a stabilizer such as a thermal stabilizer or light stabilizer, and a polymerization modifier can be used.

Various additives and a forming aid can be added to the copolymerized polyester resin of the present embodiment as long as the purpose of the present embodiment is not impaired, and examples of the additives include an antioxidant, a light stabilizer, an ultraviolet absorber, a plasticizer, an extender, a delustrant, a drying regulator, an anti-static agent, an anti-settling agent, a surfactant, a flow modifier, a drying oil, a wax, a filler, a colorant, a reinforcing agent, a surface smoothing agent, a leveling agent, a curing accelerator, and a thickener.

The copolymerized polyester resin of the present embodiment may be in the form of a resin composition further containing a resin other than the copolymerized polyester resin in the present embodiment, as long as the intended effect of the present embodiment is not impaired. Such a resin, but not particularly limited to, includes, for example, at least one resin selected from the group consisting of polyester resins other than the polyester resin in the present embodiment, polycarbonate resins, (meth)acrylic resins, polyamide resins, polystyrene resins, cycloolefin resins, acrylonitrile-butadiene-styrene copolymer resins, vinyl chloride resins, polyphenylene ether resins, polysulfone resins, polyacetal resins, and methyl methacrylate-styrene copolymer resins. These resins can be known resins, and one of these resins or a combination of two or more of these resins may be added to the resin composition.

EXAMPLES

Hereinafter, the present invention will be described in more detail with examples. The scope of the present invention is not limited by the examples. The methods employed for evaluation of polyester resins are as described below.

(1) Composition of Resin

The proportions of the diol structural unit and dicarboxylic acid structural unit in the polyester resin were calculated by 1H-NMR measurement. The measurement apparatus used was a nuclear magnetic resonance apparatus (available from JEOL Ltd., product name: JNM-AL400), and the measurement was conducted at 400 MHz. The solvent used was deuterated chloroform.

(2) Glass Transition Temperature (Tg)

The glass transition temperature of the polyester resin was measured as follows. A differential scanning calorimeter (available from Shimadzu Corporation, product name: DSC/TA-60WS) was used, and a measurement sample was prepared by placing about 10 mg of the polyester resin in an unsealed aluminum vessel, melting the polyester resin by heating to 280° C. at a temperature rise rate of 20° C./min under a stream of nitrogen gas (50 mL/min), and rapidly cooling the molten resin. This sample was subjected to measurement under the same conditions, and the glass transition temperature was determined as a temperature at which, in the DSC curve, the change reached ½ of the difference in the baseline before and after transition.

(3) Amount of Heat Generated at Cooling Crystallization (ΔHc)

The amount of heat generated by the polyester resin at cooling crystallization was calculated from the area of an exothermic peak that appeared during temperature decrease at a temperature decrease rate of 5° C./min after holding at 280° C. for 1 minute following the measurement of Tg.

(4) Melt Viscosity

The melt viscosity of the polyester resin was measured using Capirograph 1C (capirograph) available from Toyo Seiki Seisaku-sho, Ltd. under the following conditions: temperature=280° C., preheating time=6 min, nozzle diameter: 1 mm, nozzle length=10 mm, shear velocity=60 (1/sec).

(5) Photoelastic Coefficient ($Pa^{-1}$)

An ellipsometer (available from JASCO Corporation, M220) and an optical film produced by a casting method were used to measure birefringence at a wavelength of 633 nm with respect to the change in load, and the photoelastic coefficient was calculated from the measurement result.

<Monomer Synthesis Example>

A 500 mL stainless steel reaction vessel was charged with 173 g (2.01 mol) of methyl acrylate and 167 g (1.26 mol) of dicyclopentadiene, which were reacted at 195° C. for 2 hours. The reaction gave a reaction liquid containing 96 g of the monoolefin represented by the following formula (4a). This liquid was subjected to purification by distillation, and a portion of the purified product was used for the subsequent reaction.

A 300 mL stainless steel reaction vessel was used to allow the distillation-purified monoolefin represented by the formula (4a) to undergo hydroformylation reaction using a $CO/H_2$ mixed gas ($CO/H_2$ molar ratio=1) Specifically, the reaction vessel was charged with 70 g of the monoolefin represented by the formula (4a), 140 g of toluene, 0.50 g of triphenyl phosphite, and 550 μL of a separately prepared toluene solution of $Rh(acac)(CO)_2$ (concentration: 0.003 mol/L). After three cycles of purging with nitrogen and three cycles of purging with the $CO/H_2$ mixed gas, the inside of the system was pressurized with the $CO/H_2$ mixed gas, and the reaction was allowed to proceed at 100° C. and 2 MPa for 5 hours. After completion of the reaction, the reaction liquid was analyzed by gas chromatography to confirm that this reaction liquid contained 76 g of the compound represented by the formula (3a) and 1.4 g of the monoolefin represented by the formula (4a) (conversion: 98%, selectivity: 97%). The reaction liquid was subjected to purification by distillation, and a portion of the purified product was used for the subsequent reaction.

A 300 mL stainless steel reaction vessel was charged with 54 g of the distillation-purified compound represented by the formula (3a), 7 mL of a sponge cobalt catalyst (R-400, available from Nikko Rica Corporation), and 109 g of toluene, then the inside of the system was pressurized with hydrogen gas, and the reaction was allowed to proceed at 3 MPa and 100° C. for 9 hours. After the reaction, the resulting slurry was filtered through a membrane filter having a pore size of 0.2 μm to remove the catalyst. After that, the solvent was distilled off using an evaporator, and the resulting product was analyzed by gas chromatography and GC-MS to confirm that the product contained 51 g of the main reaction product represented by the formula (2a) which has a molecular weight of 250 (main reaction product yield: 93%). Purification by distillation was further conducted to obtain the main reaction product.

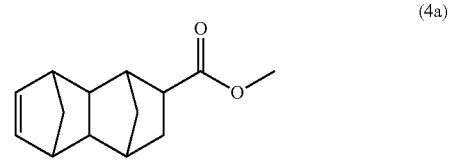

(4a)

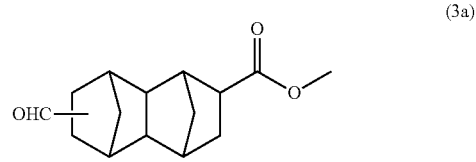

(3a)

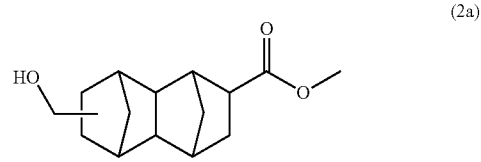

(2a)

<Identification of Reaction Product>

Figure 2:
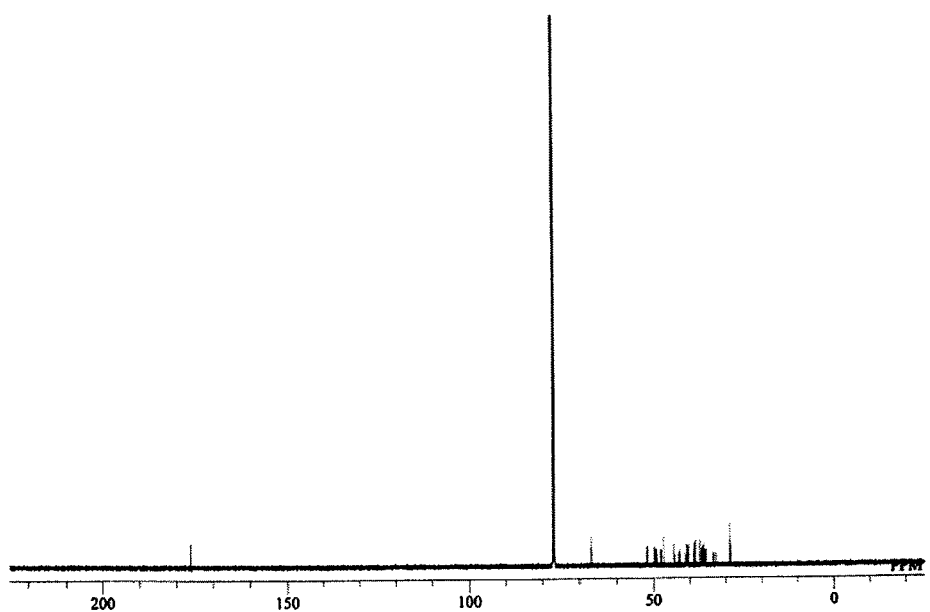
FIG. 2 shows a result of 13C-NMR measurement of the main reaction product obtained in the monomer synthesis example.
Figure 3:
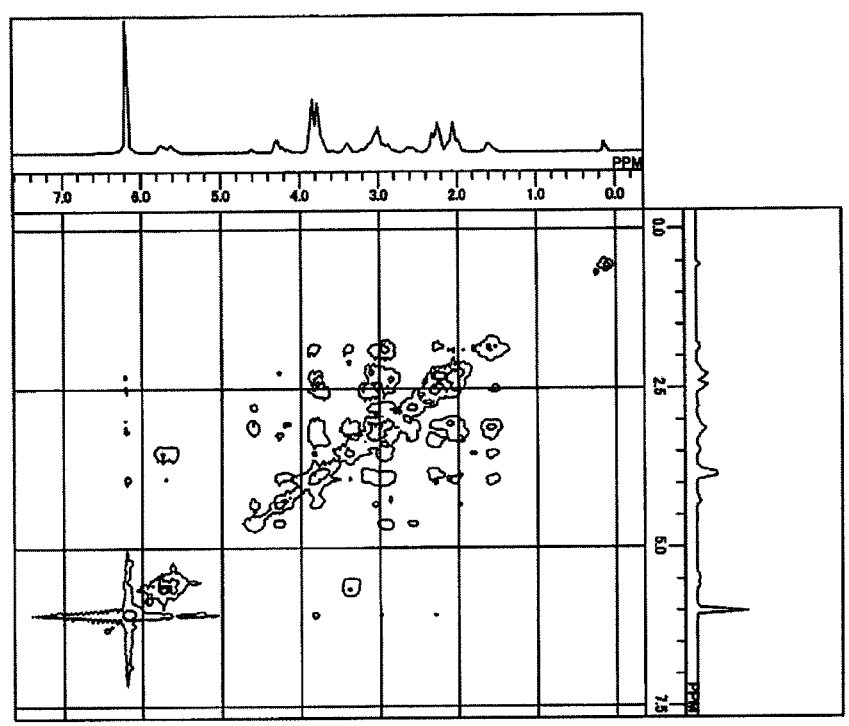
FIG. 3 shows a result of COSY-NMR measurement of the main reaction product obtained in the monomer synthesis example.

The components obtained in the monomer synthesis example were analyzed by NMR. The NMR spectra are shown in FIGS. 1 to 3. The result of GC-MS analysis specified below and the NMR analysis results shown in FIGS. 1 to 3 confirmed that the main reaction product obtained in the monomer synthesis example was the compound represented by the formula (2a).

<Analysis Method>

1) Conditions of Gas Chromatography Measurement
   Analyzer: Capillary gas chromatograph GC-2010 Plus, available from Shimadzu Corporation
   Analysis column: InertCap1 (30 m, 0.32 mm I.D., thickness: 0.25 μm), available from GL Sciences Inc.
   Oven temperature: 60° C. (0.5 minutes)–15° C./min–280° C. (4 minutes)
   Detector: FID, temperature: 280° C.

2) Conditions of GC-MS Measurement
   Analyzer: GCMS-QP2010 Plus, available from Shimadzu Corporation
   Ionization voltage: 70 eV
   Analysis column: DB-1 (30 m, 0.32 mm I.D., thickness: 1.00 μm), available from Agilent Technologies Oven temperature: 60° C. (0.5 minutes)–15° C./min–280° C. (4 minutes)
3) Conditions of NMR Measurement
Apparatus: JNM-ECA500 (500 MHz), available from JEOL Ltd.
Measurement mode: 1H-NMR, 13C-NMR, and COSY-NMR
Solvent: CDCl$_3$ (deuterated chloroform)
Internal standard: Tetramethylsilane Example 1

A 200 mL polyester production apparatus equipped with a partial condenser, a total condenser, a cold trap, a stirrer, a heater, and a nitrogen inlet tube was charged with 85.6 g of the compound represented by the formula (2a) obtained in the monomer synthesis example, 3.8 g of dimethyl 1,4-cyclohexanedicarboxylate, 2.9 g of 1,4-cyclohexanedimethanol and 0.04 g of tetrabutyl titanate. The temperature was raised to 230° C. under a nitrogen atmosphere and maintained at 230° C. for 1 hour to distil off a certain amount of methanol. After that, 0.003 g of phosphoric acid was added, the temperature was gradually raised in conjunction with gradual pressure reduction, and finally polycondensation was allowed to proceed at 270° C. and at 0.1 kPa or a lower pressure. Once an appropriate melt viscosity was reached, the reaction was terminated, and thus a copolymerized polyester resin was obtained.

An optical film to be measured for the photoelastic coefficient was produced by a casting method. Specifically, the obtained copolymerized polyester resin was dissolved in dichloromethane to a concentration of 5 wt %, and the resulting solution was cast onto a casting plate which was confirmed to be horizontally positioned and, after that, the solvent was evaporated from the cast solution along with adjustment of the amount of evaporation. Thus, a 100-µm-thick transparent optical film was obtained. The obtained optical film was thoroughly dried using a dryer at a temperature equal to or lower than the glass transition temperature, and then a 5 cm×1 cm sample was cut out from the film. The photoelastic coefficient of this sample was evaluated using an ellipsometer. The results of the various evaluations are shown in Table 1.

In Examples 2 to 13, evaluations were conducted in the same manner as in Example 1, except that starting material proportions were changed as indicated in Table 1.

Comparative Example 1

A 200 mL polyester production apparatus equipped with a partial condenser, a total condenser, a cold trap, a stirrer, a heater, and a nitrogen inlet tube was charged with 60.6 g of dimethyl terephthalate, 31.0 g of ethylene glycol, and manganese acetate tetrahydrate in an amount of 0.03 mol % based on the dimethyl terephthalate. The temperature was raised to 215° C. under a nitrogen atmosphere to distil off a certain amount of methanol. After that, antimony(III) oxide and triethyl phosphate were added in amounts of 0.02 mol % and 0.06 mol %, respectively, based on the dimethyl terephthalate, then the temperature was gradually raised in conjunction with gradual pressure reduction, and finally polycondensation was allowed to proceed at 280° C. and at 0.1 kPa or a lower pressure. Once an appropriate melt viscosity was reached, the reaction was terminated, and thus a polyester resin was obtained. For the obtained resin, the physical property evaluations were conducted in the same manner as in Example 1.

Comparative Example 2

The procedures performed were the same as those in Comparative Example 1, except that 55.3 g of dimethyl terephthalate, 23.0 g of ethylene glycol, and 12.3 g of 1,4-cyclohexanedimethanol were charged.

Comparative Example 3

The procedures performed were the same as those in Comparative Example 1, except that 8.9 g of the compound represented by the formula (2a) as obtained in the monomer synthesis example, 53.9 g of dimethyl terephthalate, and 21.8 g of ethylene glycol were charged.

TABLE 1

| | | | Example 1 | Example 2 | Example 3 | Example 4 | Example 5 | Example 6 | Example 7 | Example 8 |
|---|---|---|---|---|---|---|---|---|---|---|
| Synthesis of polyester resins | | | | | | | | | | |
| Amounts of monomers used (g) | Hydroxycarboxylic acid | D-NHEs | 85.6 | 76.3 | 73.9 | 80.2 | 55.9 | 47.4 | 46.7 | 29.5 |
| | Dicarboxylic acid/ester | DMCD | 3.8 | 9.6 | 0 | 10.1 | 22.3 | 19 | 28 | 27.5 |
| | | DDCM | 0 | 0 | 11.8 | 0 | 0 | 0 | 0 | 0 |
| | | FDPM | 0 | 0 | 0 | 0 | 0 | 0 | 0 | 0 |
| | | DMT | 0 | 0 | 0 | 0 | 0 | 0 | 0 | 0 |
| | Diol | CHDM | 2.9 | 7.1 | 6.9 | 0 | 16.3 | 13.8 | 20.4 | 20 |
| | | EG | 0 | 0 | 0 | 6.4 | 0 | 0 | 0 | 0 |
| | | SPG | 0 | 0 | 0 | 0 | 0 | 23.1 | 0 | 29.9 |
| | | BPEF | 0 | 0 | 0 | 0 | 0 | 0 | 0 | 0 |
| Evaluation results of polyester resins | | | | | | | | | | |
| Composition of copolymer (mol %) | Hydroxycarboxylic acid unit | D-NHEs | 90 | 76 | 76 | 76 | 50 | 50 | 40 | 30 |
| | Dicarboxylic acid unit | DMCD | 5 | 12 | 0 | 12 | 25 | 25 | 30 | 35 |
| | | DDCM | 0 | 0 | 12 | 0 | 0 | 0 | 0 | 0 |
| | | FDPM | 0 | 0 | 0 | 0 | 0 | 0 | 0 | 0 |
| | | DMT | 0 | 0 | 0 | 0 | 0 | 0 | 0 | 0 |
| | Diol unit | CHDM | 5 | 12 | 12 | 0 | 25 | 5 | 30 | 10 |
| | | EG | 0 | 0 | 0 | 12 | 0 | 0 | 0 | 0 |
| | | SPG | 0 | 0 | 0 | 0 | 0 | 20 | 0 | 25 |
| | | BPEF | 0 | 0 | 0 | 0 | 0 | 0 | 0 | 0 |

TABLE 1-continued

|  |  |  |  |  |  |  |  |  |  |
|---|---|---|---|---|---|---|---|---|---|
| Glass transition temperature (Tg) (° C.) | 162 | 150 | 147 | 145 | 117 | 129 | 105 | 109 |  |
| Amount of heat generated at crystallization (ΔHc) (J/g) | ND | ND | ND | ND | ND | ND | ND | ND |  |
| Photoelastic coefficient (×$10^{-12}$ $Pa^{-1}$) | 2 | 5 | 7 | 6 | 11 | 7 | 15 | 16 |  |
| Melt viscosity (Pa · s) | 900 | 700 | 800 | 600 | 500 | 550 | 400 | 300 |  |

|  |  |  | Example 9 | Example 10 | Example 11 | Example 12 | Example 13 | Comparative Example 1 | Comparative Example 2 | Comparative Example 3 |
|---|---|---|---|---|---|---|---|---|---|---|
| Synthesis of polyester resins |  |  |  |  |  |  |  |  |  |  |
| Amounts of monomers used (g) | Hydroxycarboxylic acid | D-NHEs | 28.9 | 19.3 | 9.6 | 20.9 | 74 | 0 | 0 | 8.87 |
|  | Dicarboxylic acid/ester | DMCD | 27 | 30.8 | 34.7 | 21.5 | 0 | 0 | 0 | 0 |
|  |  | DDCM | 0 | 0 | 0 | 0 | 0 | 0 | 0 | 0 |
|  |  | FDPM | 0 | 0 | 0 | 0 | 12.5 | 0 | 0 | 0 |
|  |  | DMT | 0 | 0 | 0 | 0 | 0 | 60.6 | 55.3 | 53.9 |
|  | Diol | CHDM | 26.4 | 29.2 | 31.9 | 0 | 5.5 | 0 | 12.3 | 0 |
|  |  | EG | 11.4 | 12.5 | 13.7 | 0 | 0 | 31 | 22.98 | 21.8 |
|  |  | SPG | 35.2 | 41 | 46.8 | 0 | 0 | 0 | 0 | 0 |
|  |  | BPEF | 0 | 0 | 0 | 47.5 | 0 | 0 | 0 | 0 |
| Evaluation results of polyester resins |  |  |  |  |  |  |  |  |  |  |
| Composition of copolymer (mol %) | Hydroxycarboxylic acid unit | D-NHEs | 30 | 20 | 10 | 28 | 80 | 0 | 0 | 6 |
|  | Dicarboxylic acid unit | DMCD | 35 | 40 | 45 | 36 | 0 | 0 | 0 | 0 |
|  |  | DDCM | 0 | 0 | 0 | 0 | 0 | 0 | 0 | 0 |
|  |  | FDPM | 0 | 0 | 0 | 0 | 10 | 0 | 0 | 0 |
|  |  | DMT | 0 | 0 | 0 | 0 | 0 | 50 | 50 | 47 |
|  | Diol unit | CHDM | 0 | 0 | 0 | 0 | 10 | 0 | 15 | 0 |
|  |  | EG | 5 | 5 | 5 | 0 | 0 | 50 | 35 | 47 |
|  |  | SPG | 30 | 35 | 40 | 0 | 0 | 0 | 0 | 0 |
|  |  | BPEF | 0 | 0 | 0 | 36 | 0 | 0 | 0 | 0 |
| Glass transition temperature (Tg) (° C.) |  |  | 113 | 104 | 95 | 140 | 152 | 81 | 82 | 86 |
| Amount of heat generated at crystallization (ΔHc) (J/g) |  |  | ND | ND | ND | ND | ND | 20 | ND | 8 |
| Photoelastic coefficient (×$10^{-12}$ $Pa^{-1}$) |  |  | 15 | 18 | 21 | 25 | 6 | 88 | 80 | 85 |
| Melt viscosity (Pa · s) |  |  | 350 | 300 | 300 | 350 | 500 | 200 | 300 | 200 |

The substance names corresponding to the abbreviations in Table 1 are as follows.
D-NHEs: Decahydro-1,4:5,8-dimethanonaphthalene-2-methoxycarbonyl-6(7)-methanol
DMCD: Dimethyl 1,4-cyclohexanedicarboxylate (cis/trans = 7/3)
DDCM: Dimethyl 2,6-decalindicarboxylate
FDPM: 9,9-Bis(methoxycarbonylethyl)fluorene
DMT: Dimethyl terephthalate
CHDM: 1,4-cyclohexanedimethanol (cis/trans = 3/7)
EG: Ethylene glycol
SPG: 3,9-Bis(1,1-dimethyl-2-hydroxyethyl)-2,4,8,10-tetraoxaspiro[5,5]undecane
BPEF: 9,9-Bis[4-(2-hydroxyethoxy)phenyl]fluorene The present application claims the priority based on the Japanese patent application (Japanese Patent Application No. 2016-190344) filed on Sep. 28, 2016, and the entire contents of the Japanese patent application are incorporated herein by reference.

INDUSTRIAL APPLICABILITY

The copolymerized polyester resin of the present invention is superior in heat resistance, formability, and optical characteristics, and can be suitably used, in particular, for applications requiring these physical properties. That is, the present invention is of great industrial significance.

The invention claimed is:

1. A copolymerized polyester resin comprising a unit (A) represented by the following formula (1), a diol unit (B), and a unit (C) derived from a dicarboxylic acid or an ester-forming derivative of the dicarboxylic acid,
wherein a content of the unit (A) based on total units of the copolymerized polyester resin is 10 to 95 mol %, and
the copolymerized polyester resin satisfies the following conditions (1) to (3):
(1) a glass transition temperature of the copolymerized polyester resin is 90° C. or higher;
(2) an amount of heat generated by the copolymerized polyester resin at cooling crystallization is 5 J/g or less; and
(3) an absolute value of photoelastic coefficient of the copolymerized polyester resin is $40 \times 10^{-12}$ $Pa^{-1}$ or less:

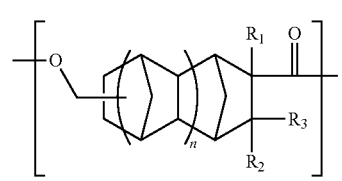

(1)

wherein
$R_1$ is a hydrogen atom, $CH_3$, or $C_2H_5$,
$R_2$ and $R_3$ are each independently a hydrogen atom or $CH_3$, and n is 0 or 1.

2. The copolymerized polyester resin according to claim 1, wherein, in the formula (1), n is 1.

3. The copolymerized polyester resin according to claim 1, wherein, in the formula (1), $R_1$, $R_2$, and $R_3$ are hydrogen atoms.

4. The copolymerized polyester resin according to claim 1, wherein the unit (B) is a unit derived from an aliphatic diol or a diol having a cardo structure.

5. The copolymerized polyester resin according to claim 1, wherein the unit (C) is a unit derived from an aliphatic dicarboxylic acid or an ester-forming derivative of the aliphatic dicarboxylic acid, or a unit derived from a dicarboxylic acid having a cardo structure or an ester-forming derivative of the dicarboxylic acid having the cardo structure.

* * * * *